United States Patent Office 3,429,879
Patented Feb. 25, 1969

3,429,879
GUANIDINIUM AZIDES
Anthony J. Papa, Grand Blanc, Mich., assignor to E. I. du Pont de Nemours and Company, Wilmington, Del., a corporation of Delaware
No Drawing. Continuation-in-part of application Ser. No. 475,868, July 29, 1965. This application Apr. 21, 1966, Ser. No. 544,108
U.S. Cl. 260—246
Int. Cl. C07c *117/00;* C07d *87/40*
26 Claims This application is a continuation-in-part of my co-pending application, Ser. No. 475,868, filed on July 29, 1965, now abandoned.

This invention concerns a new class of chemical compounds and more particularly it relates to guanidinium azides and the preparation thereof.

The new compounds of this invention are generically termed guanidinium azides and correspond to salts having the structural formula $$\left[Z=N\diagup_{R_2}^{R_1}\right]^+ N_3^-$$

wherein $R_1$ is hydrogen or methyl and $R_2$ is hydrogen, $C_1$–$C_5$ alkyl, phenyl, phenylsulfonyl, or substituted phenyls and substituted phenylsulfonyls having not more than three substituent groups (X) individually selected from the following: —$C_1$–$C_5$ alkyl, —O—$R_{12}$, —$NO_2$, Cl, Br, F, —OH, —$SO_2$—$R_{12}$,

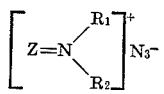

—$CO_2$—$R_{12}$ wherein $R_{12}$ and $R_{13}$ are $C_1$–$C_5$ alkyl and may be the same or different. Z is a radical having the structural formula

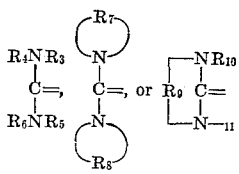

wherein $R_4$ and $R_6$ are hydrogen or $C_1$–$C_5$ alkyl and $R_3$, $R_5$, $R_{10}$ and $R_{11}$ are hydrogen, phenyl, (X) substituted phenyls, $C_1$–$C_5$ alkyls, or $C_1$–$C_5$ substituted alkyls having not more than three hydrogen atoms replaced by a

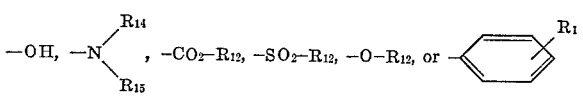

where $R_{12}$ is as represented before, where $R_{14}$ and $R_{15}$ are $C_1$–$C_5$ alkyl or phenyl and may be the same or different, and where $R_{16}$ is hydrogen or any of the substituent groups (X) previously indicated. Additionally, $R_3$ and $R_5$ can be a radical having the structure

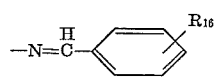

The radicals $R_7$ and $R_8$ are individually $C_2$–$C_6$ alkylene radicals and $C_2$–$C_6$ alkylene radicals containing a hetero oxygen, sulfur, or $C_1$–$C_5$ alkyl substituted nitrogen [e.g.,

atom. $R_9$ is a $C_2$–$C_6$ alkylene chain radical. There are, however, certain limitations on the above contemplated compounds. Thus, $R_1$ must be hydrogen when $R_3$, $R_4$, $R_5$, $R_6$, $R_{10}$, or $R_{11}$ are hydrogen,

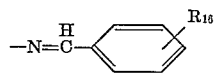

or a $C_1$–$C_5$ alkyl radical having a hydrogen atom replaced by a

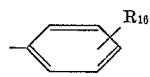

or —OH radical. Furthermore, when the radical $R_1$ is methyl, the radical $R_2$ must also be methyl.

As used in this invention, the term "$C_1$–$C_5$ alkyl radical" means a saturated univalent aliphatic hydrocarbon radical having one to five carbon atoms inclusive. This, of course, includes straight chain radicals such as methyl, ethyl, propyl, etc., and additionally the branched isomers thereof such as isopropyl, isobutyl, sec-butyl, t-butyl, isoamyl, etc. The alkylene radicals are bivalent radicals such as ethylene, trimethylene, tetramethylene, pentamethylene, etc. The term "phenylsulfonyl" refers to a radical having the structural formula

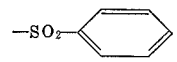

and when the substituted equivalents of this radical and the phenyl radical are referred to it is to be understood that up to three substituent groups can be present on the aromatic ring.

The new guanidinium azide compounds of this invention can be unsubstituted or substituted. Unsubstituted guanidinium azide [i.e., the compound guanidinium azide] has the structural formula

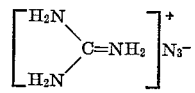

wherein two hydrogen atoms are on each of the two amino nitrogen atoms and, additionally, there are two hydrogen atoms on the imino nitrogen atom. Substituted guanidinium azides correspond to those compounds wherein one or more other radicals have replaced the hydrogen atoms in the above structure. Thus, substituted guanidinium azides can be further classified as mono-, di-, tri-, tetra-, penta-, or hexa-substituted according to whether 1, 2, 3, 4, 5, or 6 of the hydrogen atoms have been replaced by other radicals.

All the compounds of this invention wherein at least one of the substituents on the imino nitrogen atom is hydrogen can be prepared by each of several reactions. One convenient method comprises reacting the corresponding guanidine with hydrazoic acid at a temperature of less than 10° C. and in a suitable solvent. Solvents found useful in this reaction are diethyl ether, benzene, petroleum ether, carbon tetrachloride, tetrahydrofuran, dioxane, and glymes such as ethylene glycol dimethyl ether (glyme) and bis(2-ethoxyethyl) ether.

Another suitable method comprises reacting the corresponding guanidinium halide with sodium azide. This reaction is conveniently accomplished between about 0° C. and 100° C. in alcohol, tetrahydrofuran, dioxane, glymes, or ketone solvents. Particularly useful solvents for this reaction are ethanol, acetonitrile, and glyme.

A third method for the preparation of guanidinium azides wherein both of the substituents on the imino nitrogen atom are hydrogen involves the reaction of the corresponding 2-haloguanidine with sodium azide wherein the halo is chloro, bromo, or iodo. This reaction conveniently occurs at less than 50° C. when using 2-haloguanidines that are either unsubstituted or mono-, di- or tri-substituted and it has been found to be particularly desirable when using a 2-halotetrasubstituted guanidine. 2-halotetrasubstituted guanidines are new compounds that are set forth in a copending application and many of them can be reacted with sodium azide to form the corresponding tetrasubstituted guanidinium azide. To form a guanidinium azide by reacting a 2-haloguanidine with sodium azide, the reaction must be carried out in a solvent capable of liberating hydrogen atoms. Amines such as diethyl amine and alcohols such as ethanol have been found to be particularly useful solvents.

The above mentioned 2-halotetrasubstituted guanidines have additional utility in the formation of the guanidinium azides of this invention. It has been discovered that by reacting a 2-halotetrasubstituted guanidine with sodium azide in dimethyl formamide a guanidinium azide is formed wherein the imino nitrogen atom contains two methyl radical substituents. In this reaction the temperature is maintained below the decomposition temperature of the 2-halotetrasubstituted guanidine reactant, generally less than 50° C. This method of forming a hexasubstituted guanidinium azide is most conveniently accomplished using a 2-chlorotetrasubstituted guanidine as the guanidine reactant.

The following examples set forth the methods by which the compounds of this invention can be made.

EXAMPLE I

Preparation of 1,1,3,3 tetramethylguanidinium azide using hydrazoic acid

A dried ether solution of hydrazoic acid (prepared by adding 80 ml. of concentrated HCl to a cold solution (0°) of 66 g. (1.0 mole) of sodium azide in 200 ml. of water over 30 minutes and then extracting with ether) was added to a solution of 115.2 (1.0 mole) of tetramethylguanidine in 700 ml. of ether over a period of 3 hours while maintaining the temperature at 0° C. After complete addition, the mixture was allowed to stand at ambient temperature for 12 hours. Subsequently, the ether was decanted from the solid product. The product was slurried with two 100 ml. portions of ether and then crystallized from chloroform-ether and dried; yield 130.1 g. (86%) of white solid product M.P. 90–93° C. Infrared spectral analysis and analytical analysis determined this product to be 1,1,3,3 tetramethylguanidinium azide.

*Analysis.*—Calcd. for $C_5H_{14}N_6$: C, 37.96; H, 8.92. Found: C, 38.39; H, 8.99.

EXAMPLE II

Preparation of 1,1,3,3 tetramethylguanidinium azide using tetramethylguanidinium chloride and sodium azide A mixture of 15.2 g. (0.1 mole) of tetramethylguanidinium chloride and 6.5 g. (0.1 mole) of sodium azide in 150 ml. of acetonitrile was allowed to stir at ambient temperature for 4 days. Sodium chloride precipitated and was filtered from the reaction mixture and the filtrate evaporated under reduced pressure to give 14.4 g. of crude product determined to be 1,1,3,3 tetramethylguanidinium azide. Crystallization of the solid from chloroform-ether and from chloroform-benzene gave 12.1 g. (77%) of pure tetramethylguanidinium azide.

EXAMPLE III

Preparation of 1,1,3,3 tetramethylguanidinium azide using 2-chlorotetramethylguanidine and sodium azide in diethylamine 2-chlorotetramethylguanidine (7.5 g.; 0.05 mole) was added dropwise over a period of 10 minutes to a stirred suspension of 3.4 g. (0.052 mole) of sodium azide in 25 ml. of diethylamine at 0° C. The mixture was stirred at 3° C. for 5 hours. Subsequently, the excess solvent was evaporated at room temperature. The remaining solid residue was extracted with chloroform and the solution evaporated to give 6.3 g. (80%) of white solid product. Crystallization from chloroform-ether and from ethanol-ether afforded 3.4 g. (43%) of pure product. Infrared spectral analysis determined this product to be 1,1,3,3 tetramethylguanidinium azide.

EXAMPLE IV

Preparation of hexamethylguanidinium azide using 2-chlorotetramethylguanidine and sodium azide in dimethyl formamide A reaction mixture was formed by adding to a suspension of 3.3 g. (0.05) mole of sodium azide in 25 ml. of freshly distilled, anhydrous dimethyl formamide 7.0 g. (0.047 mole) of 2-chlorotetramethylguanidine. The reaction mixture was magnetically stirred at ambient temperature for 24 hours in the dark. During this time nitrogen evolved. The mixture was filtered and the filtrate was quickly concentrated by distillation under reduced pressure (0.1 mm.) while maintaining the temperature below 60° C. The residue was collected by filtration and washed with several small portions of cold, dry acetone and dried to yield 1.5 g. (16%) of a product determined to be hexamethylguanidinium azide, M.P. 150–153° C. Several crystallizations from chloroform-benzene raised the melting point to 157.5–159.5° C.

*Analysis.*—Calcd. for $C_7H_{18}N_6$: C, 45.14; H, 9.74; N, 45.12. Found: C, 45.88; H, 9.28; N, 45.20.

The following are representative samples of the guanidinium azide compounds of this invention:

(1) 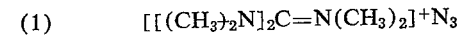

Hexamethylguanidinium azide (2) 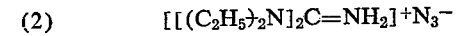

1,1,3,3-tetraethylguanidinium azide (3) 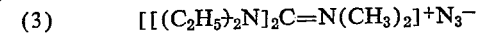

2,2-dimethyl-1,1,3,3-tetraethylguanidinium azide (4) 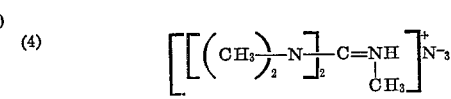

2-methyl-1,1,3,3-tetramethylguanidinium azide (5) 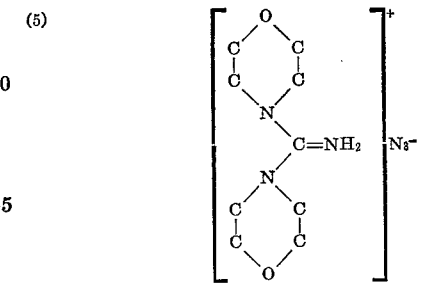

4,4'-iminomethylenedimorpholinium azide (6) 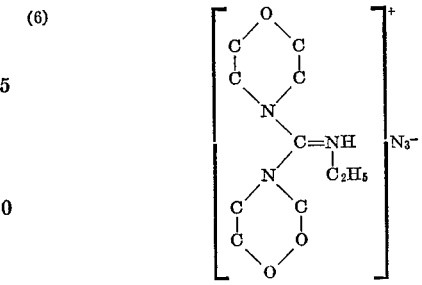

N-ethyl-4,4'-iminomethylenedimorpholinium azide (7) 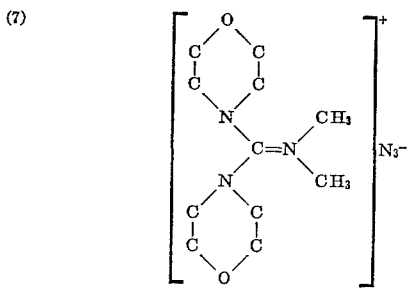

N-dimethyl-4,4'-iminomethylenedimorpholinium azide (8) 

2-methylguanidinium azide (9) 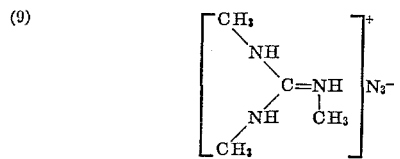

2-methyl-1,3-dimethylguanidinium azide

(10) 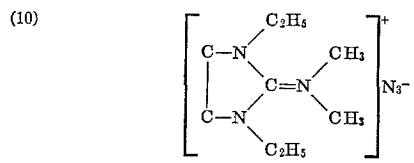

N-dimethyl-1,3-diethyl-2-iminoimidazolidinium azide

(11) 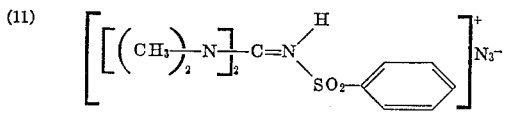

2-(phenylsulfonyl)-1,1,3,3-tetramethylguanidinium azide

(12) 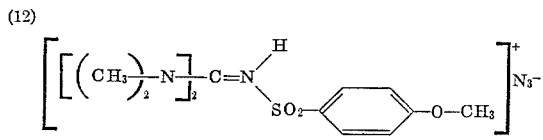

2-(p-methoxyphenylsulfonyl)-1,1,3,3-tetramethylguanidinium azide

(13) 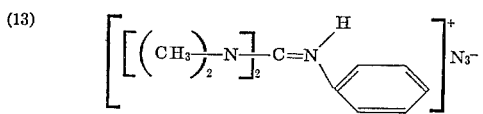

2-(phenyl)-1,1,3,3-tetramethylguanidinium azide

(14) 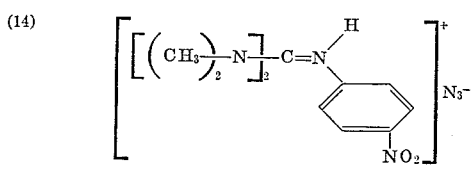

2-(p-nitrophenyl)-1,1,3,3-tetramethylguanidinium azide

(15) 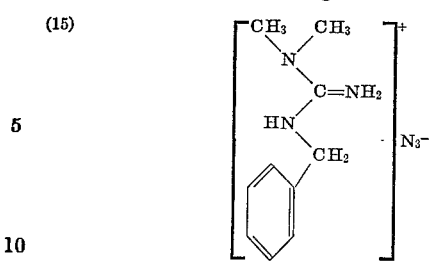

1,1-dimethyl-3(phenylmethyl)guanidinium azide

(16) 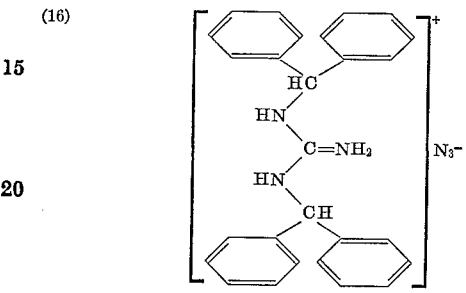

1,3-di[diphenylmethyl]guanidinium azide

(17) 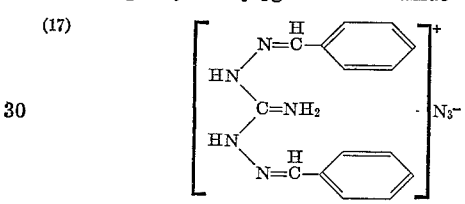

1,3-di(benzylideneamino)guanidinium azide

Additional compounds of this invention are:

1,3-di(methoxymethyl)guanidinium azide,
2-(p-nitrophenylsulfonyl)-1,1,3,3-tetrapentyl-guanidinium azide,
2-(p-hydroxyphenylsulfonyl)-1,1,3,3-tetrabutyl-guanidinium azide,
2-(p-dimethylaminophenylsulfonyl)-1,1,3,3-tetramethylguanidinium azide,
2-(p-carbomethoxyphenylsulfonyl)-1,1,3,3-tetramethylguanidinium azide,
2-(p-fluorophenylsufonyl)-1,1,3,3-tetramethyl-guanidinium azide,
2-(p-methylsulfonylphenyl)1,1,3,3-tetramethyl-guanidinum azide,
2-(p-methoxyphenyl)-1,1,3,3-tetramethylguanidinium azide,
2-(p-hydroxyphenyl)-1,1,3,3-tetramethylguanidinium azide,
2-(p-di-methylaminophenyl)-1,1,3,3-tetramethyl-guanidinium azide,
1,3-dimethyl-1,3[di(p-nitrophenylmethyl)] guanidinium azide,
1,3-dimethyl-1,3[di(p-hydroxyphenylmethyl)] guanidinium azide,
1,3-dimethyl-1,3-[di(p-methoxyphenylmethyl)] guanidinium azide,
1,3-dimethyl-1,3-[di(p-methylphenylmethyl)] guanidinium azide,
1,3-dimethyl-1,3-[di(p-dimethylaminophenyl)] guanidinium azide,
1,3-dimethyl-1,3-di[hydroxymethyl] guanidinium azide,
1,3-dimethyl-1,3-di[dimethylaminomethyl] guanidinium azide,
1,3-dimethyl-1,3-di[carbomethoxymethyl] guanidinium azide,
1,3-dimethyl-1,3-di[methoxymethyl]guanidinium azide,
1,3-di(triphenylmethyl)-guanidinium azide,
N-phenyl-4,4'-iminomethylenedimorpholinium azide, N-phenylsulfonyl-4,4′-iminomethylenedimorpholinium azide,
N-p-nitrophenylsulfonyl-4,4′-iminomethylene-dimorpholinium azide,
N-p-methoxyphenylsulfonyl-4,4′-iminomethylene-dimorpholinium azide,
N-p-dimethylaminophenylsulfonyl-4,4′-iminomethylenedimorpholinium azide,
N-p-fluorophenyl-4′,4-iminomethylenemorpholinium azide,
N-p-hydroxyphenyl-4′,4-iminomethylene-dimorpholinium azide,
N-phenyl-1,3-dimethyl-2-iminoimidazolidinium azide,
N-p-nitrophenyl-1,3-dimethyl-2-iminoimidazolidinium azide,
N-phenylsulfonyl-1,3-dimethyl-2-iminoimidazolidinium azide,
N-p-nitrophenylsulfonyl-1,3-dimethyl-2-iminoimidazolidinium azide,
2-(3,4-dichlorophenylsulfonyl)-1,1,3,3-tetramethyl-guanidinium azide,
1-(2,6-dichlorobenzylideneamino)guanidinium azide,
1,3-di(β-hydroxyethyl)guanidinium azide,
1,3-dimethyl-1,3-di(α-dimethylaminopropyl)guanidinium azide,
4,4′-iminomethylenedithiopiperidinium azide,
1,1′-iminomethylene-di(4,4′-dimethyl)piperazinium azide.

The new compounds of this invention have utility as an improved source of azide ion in many organic reactions. As opposed to many presently commercial sources of azide ion the new compounds of this invention are readily soluble in organic solvents such as chlorinated hydrocarbons, ketones, alcohols, acetonitriles, etc. An additional advantage of the guanidinium azides of this invention is their remarkable stability at elevated temperatures. Thus, hexamethylguanidinium azide can be safely used at temperatures up to 280° C.

An example of the usefulness of the compounds of this invention can be demonstrated by the ease with which β-azidoethylbenzene can be prepared. According to presently available methods this compound is prepared by refluxing β-bromoethylbenzene in an ethanol-water solvent for 24 hours with the yield generally being only about 75%. By using tetramethylguanidinium azide of this invention, β-azidoethylbenzene can be prepared with a 100% yield and in less than 2 hours. Example V presents the method of preparing β-azidoethylbenzene using tetramethylguanidinium azide.

EXAMPLE V 1,1,3,3-tetramethylguanidinium azide (2.8 g.; 0.0177 mole) was added all at once to a solution of 3.3 g. (0.0177 mole) of β-bromoethylbenzene in 25 ml. of chloroform. The mixture was heated at a gentle reflux for 1.5 hours, and then was concentrated to ½ its original volume by means of a stream of nitrogen gas. Ether (50 ml.) was added and tetramethylguanidinium chloride which precipitated was collected by filtration. The filtrate was concentrated to a pale yellow oil which on distillation furnished 2.6 g. (100%) of a colorless liquid, B.P. 52–54° (0.65 mm.). This liquid was determined to be β-azidoethylbenzene.

Similarly, Example VI presents a method of preparing ethyl α-azidoacetate using hexamethyl guanidinium azide. As with the preparation of β-azidoethylbenzene, presently available methods of synthesizing this compound require long reaction times.

EXAMPLE VI 3.3 g. (0.02 mole) of ethyl α-bromoacetate in 15 ml. of dichloromethane is added over a five minute period to a solution of 3.7 g. (0.02 mole) of hexamethylguanidinium azide in 40 ml. of dichloromethane. The temperature of the mixture rises to about 32° C. during the addition and is maintained at that temperature for ten minutes after the addition is complete. Subsequently, the mixture is heated at a gentle reflux for five minutes and is then concentrated by means of a stream of nitrogen gas. 50 ml. of ether is subsequently added and hexamethyguanidinium bromide, which precipitates, is collected by filtration. The filtrate is concentrated under reduced pressure to give a pale yellow oil which on distillation furnishes 1.4 g. (54%) of ethyl α-azidoacetate, B.P. 43° (2.0 mm.).

In fact, an exceedingly wide variety of azide containing compounds can be prepared by methods similar to those given above. In general, these compounds are prepared by reacting any organic compound having an active leaving group on an aliphatic carbon atom with a guanidinium azide. As used above the term "aliphatic carbon atom" means a carbon atom having no contiguous unsaturation, though unsaturation can be, and frequently is, present in other portions of the compound. Similarly, the term "active leaving group" defines those substituent groups that can be easily displaced from an aliphatic carbon atom. Of course, the propensity of a group to be displaced depends upon the group itself and the various activating functional groups in the compound. For example, the chlorine atom in allyl chloride has a greater propensity to be displaced than does the chlorine atom in 1-chloropropane.

Among others, examples of useful active leaving groups are halogens (Cl, Br, I), nitrite ester (—ONO), and sulfonates having the structure —$OSO_2$—$R_{17}$. The radical, $R_{17}$, can be selected from a wide variety of groups including: alkyls such as methyl, ethyl, n-butyl, t-butyl, 1-pentyl, etc.; aryls such as phenyl, napthyl, biphenylyl, etc.; and substituted alkyls and aryls, especially p-tolyl and p-bromophenyl.

As Examples V and VI illustrate the reaction to form the azide containing compound proceeds readily under atmospheric conditions and at the solvent refluxing temperature. While frequently the reaction occurs at room temperature, it is preferably carried out at the refluxing temperature due to the increased reaction rate. In addition to the chlorinated solvents used in the above examples any of the other well known inert solvents mentioned as useful in preparing the guanidinium azide compounds can be employed. Additionally, the reaction can be accomplished in the absence of an inert solvent if one of the reactants itself can serve as the solvent.

Table I presents examples of additional organic azides prepared by methods similar to those given in Examples V and VI. In particular, these azides are prepared by reacting, in refluxing chloroform, tetramethylguanidinium azide with the listed organic reactant.

TABLE I

| Halide reactant | Organic azide product | Yield percent | Reaction time (min.) |
| --- | --- | --- | --- |
| Benzyl chloride | Benzyl azide | 91 | 60 |
| 1-chlorohexane | 1-azidohexane | 60 | 240 |
| Ethyl α-chloroacetate | Ethyl α-azidoacetate | 89 | 60 |
| Benzhydryl bromide | Benzhydryl azide | 81 | 60 |

While Examples V and VI and Table I relate to the preparation of monofunctional azide compounds, polyfunctional azide compounds can also be prepared by the same methods. Of course, when preparing such polyfunctional azide compounds at least two active leaving groups must be present in the corresponding reactant compound.

In particular, the above described method is useful for the preparation of difunctional azides which in turn can be used for making polymers with high temperature stability.

For example, the difunctional azide represented by the structure

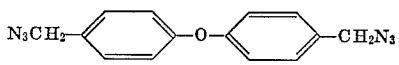

can be easily prepared by reacting the corresponding difunctional chloride with tetramethylguanidinium azide. The reaction which is exothermic can be accomplished at room temperature in a chloronated solvent by slowly adding the guanidinium azide to the difunctional chloride. The difunctional azide product can be recovered by known techniques. The particular advantage in using the azides of this invention instead of a commercial inorganic azide such as sodium azide resides in the increased ease of handling. Sodium azide is only slightly soluble in most organic solvents and correspondingly an elevated reaction temperature must be used. However, at elevated temperatures, the difunctional azide product is very unstable and great care must be exercised in its formation using sodium azide. This problem is not present when using tetramethylguanidinium azide since the reaction readily proceeds at room temperature where the difunctional azide product is stable. The above difunctional azide can be reacted with 1,4-(diphenylphosphino)benzene and a polymer formed having the recurring unit

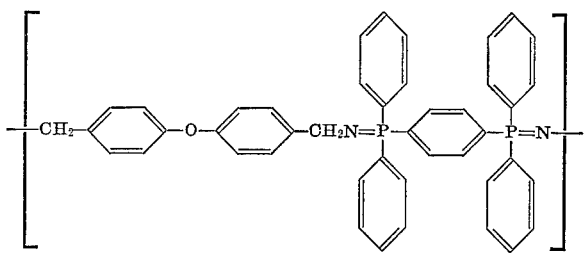

In a similar fashion a difunctional azide having the structure

can be obtained and polymerized with 1,4-(diphenylphosphino)benzene. The polymers, thus formed, exhibit considerable utility in high temperature applications such as wire coatings.

Further evidence of the usefulness of the compounds of this invention is demonstrated by their reaction with nitriles to give 5-substituted tetrazoles. 5-substituted tetrazoles are known compounds which are useful for such purposes, among others, as medicinals, dye intermediates, brightening agents, light stabilizing agents, and plasticizers. While several methods are available for preparing these compounds they are all accompanied by one or more disadvantages such as long reaction times and low yields. U.S. Patent 2,977,372 presents a method for preparing such tetrazoles in good yields with acceptable reaction times, but with the requirement that a high boiling polar inert solvent (e.g. dimethylformamide) must be used. The disadvantage of requiring the use of such a solvent resides in the necessity of subsequently removing it.

However, by using the guanidinium azides of this invention, 5-substituted terazoles can be readily prepared in good yields in the absence of an inert solvent. This is accomplished by simply reacting a nitrile with a guanidinium azide and subsequently acidifying the reaction mixture and recovering the 5-substituted tetrazole product. Generally the reaction occurs at a temperature between about 75° C. and 150° C., though for some nitriles the reaction occurs at a higher or lower temperature. 1,1,3,3,-tetramethylguanidinium azide is preferably used as the azide reactant since it is a liquid over most of the aforementioned temperature range and the nitrile reactant, if a solid, can be readily dissolved in it. However, for many reactions the nitrile reactant is a liquid below or at the reaction temperature and, consequently, serves as a solvent for the azide reactant.

Acidification of the reaction mixture is generally accomplished by first adding water to the reaction mixture and subsequently adding acetic acid or a mineral acid such as HCl, care be taken in the event that hydrazoic acid is evolved. In general, 5-substituted tetrazoles are insoluble in water and can be recovered by filtration of the acidified aqueous reaction mixture. However, when the tetrazole product is soluble in water its recovery can be accomplished by other known techniques. A variety of useful tetrazole recovery methods are given in J. Am. Chem. Soc. 80, 3908 (1958).

In general almost any nitrile that does not contain carboalkoxy, halide (i.e. Cl, Br, or I), nitrite ester, or sulfonate substituent groups can be used in the reaction of this invention. More particularly, nitriles having the structure R—C≡N are reacted with a guanidinium azide of this invention to prepare 5-substituted tetrazoles having the structure

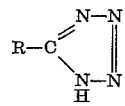

R represents an aryl, alkyl or amino group or a variety of corresponding substituted structures. In particular, R can be an aryl which has an independent ring structure such as phenyl or biphenylyl or an aryl which has a condensed ring structure such as napthyl. Representative alkyls are those such as methyl, ethyl, propyl, isopropyl, n-butyl, sec-butyl, t-butyl, n-hexyl, 2-ethyl-1-butyl, decyl, etc. Similarly useful amino groups can be represented as

wherein R' and R" can individually by hydrogen, alkyl, or aryl.

R can also represent an aryl, alkyl, or amino group that contains one or more substituent groups. Representative substituent groups include hydroxy, alkoxy, alkyl, aryl, aralkyl, nitro, sulfone, and cyano. In particular when R is substituted with a cyano group, the nitrile reactant is difunctional and the corresponding tetrazole product is a di(5-substituted tetrazole). Especially good yields of this latter class of tetrazoles are obtained when the molar reactant ratio of azide to nitrile is 2 to 1.

Example VII illustrates the preparation of 5-dimethylamino tetrazole.

EXAMPLE VII

A mixture of dimethylcyanamide (3.5 g., 0.05 mole) and a 1,1,3,3-tetramethylguanidinium azide (7.9 g., 0.05 mole) is heated to 100° C. and stirred at that temperature for 7 hours. Subsequently the reaction mixture is cooled to room temperature, dissolved in 30 ml. of water, and acidified with glacial acetic acid, the acidification being followed with pH paper to avoid an excess of acid. On acidification, 5-dimethyamino tetrazole precipitates which is collected by filtration, washed with cold water, and dried, yield 4.7 g. (83%), M.P. 238° C. (dec.) Subsequent recrystallization from ethanol yields 4.0 g. (71%) of product, M.P. 240° C. (dec.).

Table 2 presents additional 5-substituted tetrazoles that are prepared by the method of this invention. In preparing the tetrazoles presented in this table, 1,1,3,3-tetramethylguanidinium azide is used and hydrochloric acid (conc.) is employed to acidify the reaction mixture.

TABLE 2

| Nitrile (R—C≡N) R | 5-substituted tetrazole [Y is C with N-N/N-N-H ring] | Yield percent | Reaction time (hr.) | Reaction temp. (° C.) | M.P. (° C.) |
|---|---|---|---|---|---|
| $C_6H_5-$ | $C_6H_5-Y$ | 75 | 3 | 100 | [1] 216 |
| $C_6H_5-$ | $C_6H_5-Y$ | 100 | 6 | 125 | [1] 214 |
| $C_6H_5CH_2-$ | $C_6H_5CH_2-Y$ | 94 | 6.5 | 120 | 123-124 |
| $4-CH_3OC_6H_4-$ | $4-CH_3OC_6H_4-Y$ | 30 | 3 | 100 | 231-232 |
| 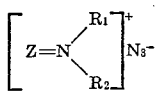 | 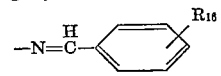 | 100 | 1.5 | 120 | [1] 309 |

[1] Dec.    [2] Explodes.

What is claimed is:

1. A guanidinium azide having the formula $$\left[ Z=N\begin{matrix}R_1\\R_2\end{matrix}\right]^+ N_3^-$$

wherein:

$R_1$ is selected from the group consisting of hydrogen and methyl;

$R_2$ is selected from the group consisting of hydrogen, $C_1$–$C_5$ alkyl, phenyl, phenylsulfonyl and substituted phenyls and phenylsulfonyls having not more than three substituent groups (X) individually selected from the group consisting of $C_1$–$C_5$ alkyl, —O—$R_{12}$, $$-N\begin{matrix}R_{12}\\R_{13}\end{matrix}$$

—$NO_2$, —$CO_2$—$R_{12}$, Cl, Br, —F, —OH, and $SO_2$—$R_{12}$ wherein $R_{12}$ and $R_{13}$ are individually $C_1$–$C_5$ alkyl; and Z is selected from the group consisting of (a) 

(b) 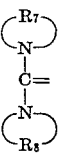

and (c) 

wherein:

$R_4$ and $R_6$ are individually selected from the group consisting of hydrogen and $C_1$–$C_5$ alkyl;

$R_3$ and $R_5$ are individually selected from the group consisting of hydrogen,

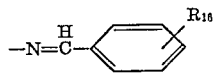

phenyl, substituted phenyls having not more than three substituent groups (X), $C_1$–$C_5$ alkyl, and $C_1$–$C_5$ alkyl having not more than three hydrogen atoms replaced by a radical (Y) selected from the group consisting of

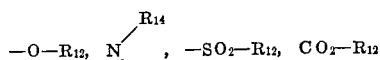

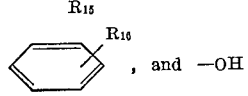, and —OH wherein $R_{14}$ and $R_{15}$ are selected from the group consisting of $C_1$–$C_5$ alkyl and phenyl, and $R_{16}$ is from the group consisting of hydrogen and (X);

$R_{10}$ and $R_{11}$ are individually selected from the group consisting of hydrogen, $C_1$–$C_5$ alkyl, and $C_1$–$C_5$ alkyl having not more than three hydrogen atoms replaced by (Y);

$R_7$ and $R_8$ are individually selected from the group consisting of $C_2$–$C_6$ alkylenes and $C_2$–$C_6$ alkylenes containing a hetero atom selected from the group consisting of oxygen, sulfur, and $C_1$–$C_5$ alkyl substituted nitrogen; and $R_9$ is $C_2$–$C_6$ alkylene with the proviso that:

$R_1$ is hydrogen when $R_3$, $R_4$, $R_5$, $R_6$, $R_{10}$ or $R_{11}$ is hydrogen,

or a $C_1$–$C_5$ alkyl having a hydrogen atom replaced by a

or —OH; and $R_2$ is methyl when $R_1$ is methyl.

2. The guanidinium azide of claim 1 wherein $R_2$ is selected from the group consisting of hydrogen, $C_1$–$C_5$ alkyl, phenyl, and phenylsulfonyl, and $R_3$, $R_5$, $R_{10}$ and $R_{11}$ are individually selected from the group consisting of hydrogen, $C_1$–$C_5$ alkyl, and phenyl.

3. The guanidinium azide of claim 1 wherein Z has the Formula $a$.

4. The guanidinium azide of claim 1 wherein Z has the Formula $b$.

5. The guanidinium azide of claim 1 wherein Z has the Formula $c$.

6. The compound of claim 1 having Z, $R_1$, and $R_2$ selected such that the compound is guanidinium azide.

7. The compound of claim 1 having Z, $R_1$, and $R_2$ selected such that the compound is 1,1,3,3-tetramethylguanidinium azide.

8. The compound of claim 1 having Z, $R_1$, and $R_2$ selected such that the compound is hexamethylguanidinium azide.

9. The compound of claim 1 having Z, $R_1$, and $R_2$ selected such that the compound is 4,4'-iminomethylenedimorpholinium azide.

10. The compound of claim 1 having Z, $R_1$, and $R_2$ selected such that the compound is N-dimethyl-4,4'-iminomethylenedimorpholinium azide.

11. The compound of claim 1 having Z, $R_1$, and $R_2$ selected such that the compound is 1,3-dimethyl-2-iminoimidazolidium azide.

12. The compound of claim 1 having Z, $R_1$, and $R_2$ selected such that the compound is n-dimethyl-1,3-dimethyl-2-iminoimidazolidium azide.

13

13. A method of forming a guanidinium azide of claim 1 wherein $R_1$ is hydrogen comprising reacting the corresponding guanidine, dissolved in a solvent, with hydrazoic acid.

14. A method of forming a guanidinum azide of claim 1 wherein $R_1$ is hydrogen comprising reacting a compound selected from the group consisting of the corresponding guanidinium halide and the corresponding 2-haloguanidine, dissolved in a solvent, with sodium azide.

15. A method of forming a hexasubstituted guanidinium azide of claim 1 wherein $R_1$ and $R_2$ are methyl comprising reacting the corresponding 2-halotetrasubstituted guanidine, dissolved in dimethyl formamide, with sodium azide.

16. The method of claim 15 wherein the 2-halotetrasubstituted guanidine is a 2-chlorotetrasubstituted guanidine.

17. A process for preparing an organic azide which comprises reacting a guanidinium azide of claim 1 with an organic compound having an active leaving group on an aliphatic carbon atom, whereby the active leaving group in the organic compound is displaced by the azide ion.

18. The process of claim 17 wherein the reaction is carried out in the presence of a solvent.

19. The process of claim 18 wherein the organic compound contains two active leaving groups and the organic azide product is a di-functional azide.

20. The process of claim 18 wherein the guanidinum azide is 1,1,3,3-tetramethylguanidinium azide or hexamethylguanidinium azide.

14

21. The process of claim 20 wherein the active leaving group is selected from halogen, nitrite ester, and sulfonate.

22. The process of claim 21 wherein the organic compound contains two active leaving groups and the organic azide product is a di-functional azide.

23. A process for preparing 5-substituted tetrazoles which comprises reacting a guanidinium azide of claim 1 with a nitrile, said nitrile being free of carboalkoxy, halide, nitrite ester or sulfonate substituent groups.

24. The process of claim 23 wherein the guanidinium azide is 1,1,3,3-tetramethylguanidinium azide.

25. The process of claim 23 wherein the nitrile has the structure R—C≡N wherein R is an aryl, an alkyl, an amino group, or a substituted aryl, alkyl, or amino group having substituents selected from hydroxy, alkoxy, alkyl, aryl, aralkyl, nitro, sulfone, and cyano.

26. The process of claim 25 wherein the guanidinium azide is 1,1,3,3-tetramethylguanidinium azide.

References Cited

Boyer et al.: "Chem. Reviews," vol. 54, pp. 2, 10 and 11 (1954).

HENRY R. JILES, *Primary Examiner.*

R. T. BOND, *Assistant Examiner.*

U.S. Cl. X.R.

260—2, 47, 80.71, 239, 240.7, 256.4, 256.5, 293, 293.4, 294.7, 308, 309.7, 349

UNITED STATES PATENT OFFICE

CERTIFICATE OF CORRECTION

Patent No. 3,429,879            February 25, 1969

Anthony J. Papa

It is certified that error appears in the above identified patent and that said Letters Patent are hereby corrected as shown below:

Column 14, line 14, "R-C=N" should read -- R-C≡N --.

Signed and sealed this 24th day of March 1970.

(SEAL)
Attest:

Edward M. Fletcher, Jr.            WILLIAM E. SCHUYLER, JR.

Attesting Officer            Commissioner of Patents